A. G. SHAVER.
RAMP RAIL.
APPLICATION FILED MAY 12, 1919.
1,433,973.
Patented Oct. 31, 1922.
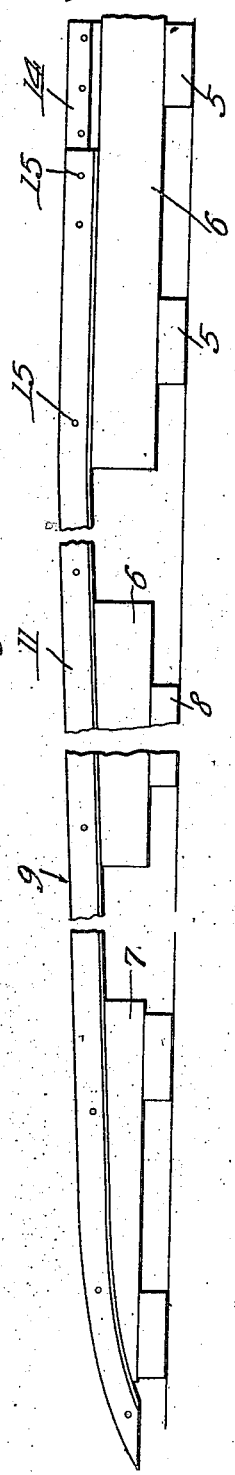
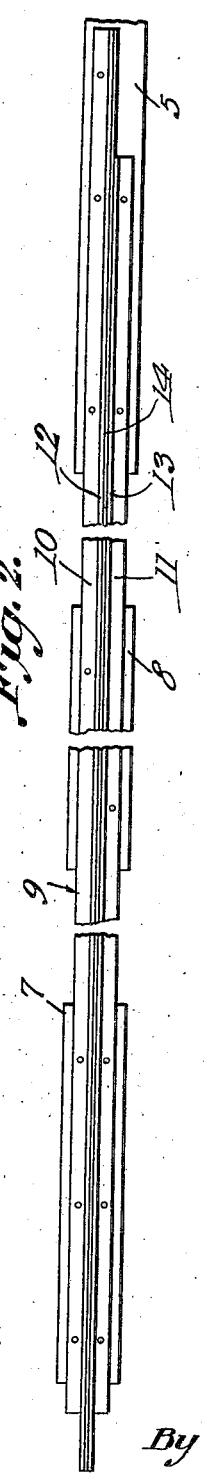
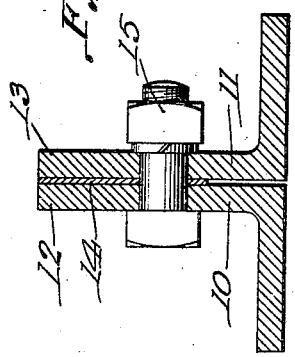
Inventor
Archibald G. Shaver
By David Pelten Moore
Attorney Patented Oct. 31, 1922.

1,433,973

UNITED STATES PATENT OFFICE.

ARCHIBALD G. SHAVER, OF CHICAGO, ILLINOIS, ASSIGNOR, BY MESNE ASSIGNMENTS, TO REGAN SAFETY DEVICES COMPANY, INCORPORATED, A CORPORATION OF NEW YORK.

RAMP RAIL.

Application filed May 12, 1919. Serial No. 296,664.

*To all whom it may concern:*

Be it known that ARCHIBALD G. SHAVER, a citizen of the United States, residing at Chicago, in the county of Cook and State of Illinois, has invented certain new and useful Improvements in Ramp Rails, of which the following is a specification, reference being had therein to the accompanying drawing.

My present invention relates to improvements in ramp rails for use in connection with intermittent automatic stop and train control systems, one object of the invention being the provision of a ramp rail made in sections and provided with an insert for exposure upon the wiring surface of the ramp so as to insure of a better electrical connection.

A further object of this invention is the provision of a ramp rail which is made up of sections so that the same can be made of any desired length according to the requirements and so secured and held in place as to bear up under service conditions.

In the accompanying drawings:

Figure 1 is a side elevation of one end of the ramp.

Figure 2 is a top plan view thereof.

Figure 3 is an enlarged detail cross sectional view through the same.

Referring to the drawings, the numeral 5 designates one method of support for the longitudinal blocks 6 and 7 which are properly supported upon the ties 8.

The ramp rail 9 consists of two main sections 10 and 11, each one of which as shown in Figure 3, is L-shaped in cross section while the end sections are curved to enable the shoe carried by the locomotive to engage the same without too sudden a jar or without any tendency to tear up the ramp rail. The sections 10 and 11 are connected by bolts or spikes to the supporting members 6 and the ends of such sections alternate in over-lapping relation so that the greatest rigidity is had in the present construction.

Mounted between the contact flanges 12 and 13 of the respective members 10 and 11 is a strip 14 of hard copper or the like material, the members 10 and 11 being what is known in the trade as steel angles. The strip 14 of hard copper and the adjacent portions of the sections 10 and 11 are correspondingly punched to receive the fastening bolts 15 so that the parts will be clamped firmly together with the upper edge of the copper insert 14 coincident or in alinement with the upper edges of the shoe engaging surfaces 12 and 13 of the sections 10 and 11. By this means a better conducting surface is provided and in consequence a better contact for the shoe carried by the locomotive is secured.

It will be noted that the lower edge of the copper insert 14 terminates at a point slightly below the bolts 15.

What I claim as new is:

1. A ramp rail for an intermittent contact train control system having a contact surface provided with a longitudinal insert of a material of greater conductivity than the main body of the ramp rail, said main body comprising two separable members, and clamping means for holding them and the insert together.

2. A ramp rail including two metal angle members bolted together to provide a ramp engaging surface, and an insert between the two having its edge flush with the contact surface of the angles, said insert being of a material having a greater conductivity than the angles.

3. A ramp rail including two main supporting and contact receiving members, an insert of a material of greater electrical conductivity carried thereby the full length of the contact receiving member and clamping means extending through the contact securing members and said insert.

In testimony whereof I affix my signature.

ARCHIBALD G. SHAVER.